US007064857B2

(12) United States Patent
Parker et al.

(10) Patent No.: US 7,064,857 B2
(45) Date of Patent: Jun. 20, 2006

(54) ADVERTISING METHOD AND APPARATUS

(75) Inventors: Mary Louise Parker, Nashville, TN (US); Bob Summers, Atlanta, GA (US)

(73) Assignee: Subject Matters, LLC, Nashville, TN (US)

( * ) Notice: Subject to any disclaimer, the term of this patent is extended or adjusted under 35 U.S.C. 154(b) by 946 days.

(21) Appl. No.: 09/940,564

(22) Filed: Aug. 28, 2001

(65) Prior Publication Data

US 2003/0043409 A1 Mar. 6, 2003

(51) Int. Cl.
*G06F 15/00* (2006.01)

(52) U.S. Cl. .................... 358/1.18; 358/1.1; 358/1.14; 358/1.15; 358/296; 358/540

(58) Field of Classification Search ............... 358/1.18, 358/1.1, 1.14–1.15, 296, 540; 273/236
See application file for complete search history.

(56) References Cited

U.S. PATENT DOCUMENTS

| | | | | |
|---|---|---|---|---|
| 50,437 | A | 10/1865 | Atterbury | |
| 150,184 | A | 4/1874 | Osmun | |
| 222,594 | A | 12/1879 | Marra | |
| 783,170 | A | 2/1905 | Beach | |
| 1,034,313 | A | 7/1912 | Shafer et al. | 215/6 |
| 1,196,803 | A | 9/1916 | Mulholland | 40/324 |
| 1,301,596 | A | 4/1919 | Patton | 220/574 |
| 1,342,223 | A | 6/1920 | Nakamura | 40/324 |
| 1,536,716 | A | 5/1925 | Kade | 40/324 |
| 1,829,861 | A | 11/1931 | Holt | 40/324 |
| 2,010,534 | A | 8/1935 | Collins | 220/568 |
| 2,171,350 | A | 8/1939 | Anderson | 40/324 |
| 2,224,683 | A | 12/1940 | Ide et al. | 40/324 |
| 2,485,922 | A | 10/1949 | Rubin | 40/324 |
| 2,781,650 | A | 2/1957 | Lee | 40/324 |
| 2,945,314 | A | 7/1960 | Baldwin | 40/324 |
| 2,984,035 | A | 5/1961 | Nalle, Jr. | 40/324 |
| D217,632 | S | 5/1970 | Bouchet | |
| 3,514,887 | A | 6/1970 | Jacob | 40/324 |
| 3,515,262 | A | 6/1970 | Omstein et al. | 206/217 |
| 3,574,957 | A | 4/1971 | Bello-Bridick | 434/173 |
| 3,813,801 | A | 6/1974 | Vander Schaaf | 40/306 |
| 3,818,623 | A | 6/1974 | Wilton et al. | 40/324 |
| 4,275,518 | A | 6/1981 | Martin | 40/324 |
| 4,432,153 | A | 2/1984 | Bachman et al. | 40/324 |
| 4,534,391 | A | 8/1985 | Ventimiglia et al. | 220/739 |
| 4,588,539 | A | 5/1986 | Rossi et al. | 264/40.5 |
| 4,609,140 | A | 9/1986 | Van Handel et al. | 229/406 |
| 4,721,499 | A | 1/1988 | Marx et al. | 493/152 |
| 4,721,500 | A | 1/1988 | Van Handel et al. | 493/152 |

(Continued)

OTHER PUBLICATIONS

Conversation Coasters; "Art History"; Facts, Quotes, Trivia & More; o.r.e; Made in the USA © 1996.

(Continued)

*Primary Examiner*—Twyler M. Lamb
(74) *Attorney, Agent, or Firm*—Dickstein, Shapiro, Morin & Oshinsky, LLP.

(57) ABSTRACT

A method for advertising, comprising the steps of generating a high-quality image; placing one or more advertising data in a predetermined location of the high-quality image; and fixing the high-quality image and advertising data to a utilitarian object. The advertising data is thereby placed in the high-quality image on an object therein so that the advertising data appears to be part of the particular object in the high-quality image.

24 Claims, 22 Drawing Sheets

U.S. PATENT DOCUMENTS

| | | | | |
|---|---|---|---|---|
| 4,832,676 | A | 5/1989 | Johns et al. | 493/152 |
| 4,972,329 | A * | 11/1990 | Breger | 358/1.18 |
| 5,088,640 | A | 2/1992 | Littlejohn | 229/406 |
| 5,112,064 | A | 5/1992 | Weedman | 273/429 |
| 5,123,190 | A | 6/1992 | Erberber | 40/324 |
| 5,163,608 | A | 11/1992 | Block | 229/92.8 |
| 5,191,979 | A | 3/1993 | Nemeroff | 206/459.5 |
| 5,205,473 | A | 4/1993 | Coffin, Sr. | 229/403 |
| 5,230,939 | A | 7/1993 | Baum | 428/84 |
| 5,275,277 | A | 1/1994 | Gallegos | 206/217 |
| 5,326,020 | A | 7/1994 | Cheshire et al. | 229/407 |
| 5,339,548 | A | 8/1994 | Russell | 40/324 |
| 5,356,070 | A | 10/1994 | Rigby | 229/120.17 |
| 5,375,846 | A | 12/1994 | Smith | 273/292 |
| 5,520,278 | A | 5/1996 | Hughes | 206/217 |
| 5,560,653 | A | 10/1996 | Beppu | 283/117 |
| 5,593,062 | A | 1/1997 | Martin | 220/574.1 |
| 5,621,864 | A | 4/1997 | Benade et al. | 358/1.18 |
| 5,640,790 | A * | 6/1997 | Johns | 40/324 |
| 5,721,813 | A | 2/1998 | Leinhos | 358/1.18 |
| 5,729,922 | A | 3/1998 | Peterson et al. | 40/324 |
| 5,749,292 | A | 5/1998 | DeBastiani et al. | 101/129 |
| 5,769,715 | A | 6/1998 | Brown | 463/10 |
| 5,829,626 | A | 11/1998 | Brennan | 220/574 |
| 5,871,116 | A | 2/1999 | Picchietti | 220/501 |
| 5,894,948 | A | 4/1999 | Yeh | 215/12.1 |
| 5,938,066 | A | 8/1999 | DeMars | 220/574.1 |
| 5,938,112 | A | 8/1999 | Sandstrom | 229/407 |
| 5,992,892 | A | 11/1999 | Schaefer et al. | 215/383 |
| 6,041,948 | A | 3/2000 | Filipak et al. | 211/85.1 |
| 6,053,352 | A | 4/2000 | Cai | 220/739 |
| 6,116,503 | A | 9/2000 | Varano | 229/403 |
| 6,125,374 | A | 9/2000 | Terry et al. | 715/502 |
| 6,190,741 | B1 * | 2/2001 | Miranda | 427/536 |
| 6,271,932 | B1 | 8/2001 | Liedtke | 358/1.18 |
| 6,655,284 | B1 * | 12/2003 | Hoshii et al. | 101/484 |

OTHER PUBLICATIONS

Conversation Coasters; "Bizarre Words"; A Coaster Dictionary of Strange Words; o.r.e.; Made in the USA © 1996.
Conversation Coasters; "Coffee"; Facts, Quotes, Trivia & More; o.r.e; Made in the USA © 1995.
Conversation Coasters; "Drink Trivia"; Facts, Quotes, Trivia & More; o.r.e; Made in the USA © 1996.
Conversation Coasters; "Famous Inventions"; Facts, Quotes, Trivia & More; o.r.e; Made in the USA © 1996.
Conversation Coasters; "Millennium Trivia"; Facts, Quotes, Trivia & More; o.r.e; Made in the USA © 1999.
Conversation Coasters; "Pick Up Lines"; Facts, Quotes, Trivia & More; o.r.e; Made in the USA © 1995.
Conversation Coasters, "Wine"; Facts, Quotes, Trivia & More; o.r.e; Made in the USA © 1996.
"Sexual Secrets"; The Game of Intimate Confessions; TDC Games, Inc., Copyright 1990.
"Rumors", the most fun you can have talking!; Decipher Inc. Copyright 1997.
"Big Happy Vacation"; A Game of Family Discovery.
"PROMOCUP"; Introducing . . . "The Billboard on a Cup"™ for Promocup, Inc.
"Riddles for Kids™" Dixie® For Quick Drinks; 7 oz. cups.
Hand Painted Glassware by Smithereens.
Cup Sleeve "Melvyn's Darn Good Coffee"; Careful, This Coffee's Darn Hot!; Einstein Bros® Bagels.
Cup Sleeve "Seattle's Best"; Bold Flavor—Smooth Taste Coffee; © Seattle's Best Coffee, LLC; "go to the mountains to learn mountains and to Seattle to learn Beans"; www.seattlesbestcoffee.com.
Cup Sleeve "Caribou Coffee"; Expresso Truths; Expresso drinks come in different sizes. But only because mornings do, too.
Cup Sleeve "Caribou Coffee"; Expresso Truths: Blind taste tests have proven that this coffee clutch™ is "less yummy" than a mocha.
Coffee Sleeve "Starbucks Coffee", © 2000 Starbucks Coffee Company.
Coffee Sleeve "Java Jacket®"; Portland, Oregon.
Question Book "If . . . Questions for Parents"; Evelyn McFarlane & James Saywell.
Question Book "If$^2$ . . . (500 New Questions for the Game of Life)"; Evelyn McFarlane & James Saywell.
Question Book If . . . (Questions for the Game of Life); Evelyn McFarlane & James Saywell.

* cited by examiner

ADVERTISING METHOD AND APPARATUS

The entire contents of U.S. application Ser. No. 09/925,443 filed Aug. 9, 2001 is hereby incorporated herein by reference.

BACKGROUND OF THE INVENTION

Advertising is an important medium for presenting a brand name to a user. However, rather than simply presenting a brand name, it is necessary for an advertising medium to present a company's brand name in a way that a user is not put-off by the presentation. Therefore, it would be desirable to improve promotion and advertising methods and apparatus to achieve these goals.

SUMMARY OF THE INVENTION

Generally speaking and in accordance to the invention, an improved advertising method and apparatus are provided in which a high-quality, photographic image is presented on a plate or other similar useful item. This high-quality photograph is designed to look life like, and may include objects related to a company's material business, or objects that can include a logo thereon in a subtle and tasteful manner. Rather than simply providing a logo across the photo, the company's logo is embedded to look as if it were part of one of the objects included in the photograph. In this manner, the firm's logo is presented in a palatable manner, is easily visible to a viewer, and associates the logo and company name with a particular product or field of use.

Additionally, the photograph is preferably a high-quality photographic image, chemical or digital, but may comprise any photographic technique of sufficient quality. This photograph in digital format may comprise up to as high as 850 dpi, or higher, so a lifelike image is produced. This photograph, including company logo information is preferably printed on a reverse side of a food quality film. This food quality film is then fixed to the plate or other utilitarian object noted above. Preferably, this utilitarian object comprises a disposable plate, or a permanent plate, but may comprise other objects such as a clamshell, food container, cup, other tableware or the like, as desired. In this manner, the high quality photograph, including desired advertisements and objects in similar fields of use are presented in a flattering, inexpensive, unobtrusive and highly distributable manner.

Still other objects and advantages of the invention will in part the obvious and will in part be apparent from the specification and the drawings.

The invention accordingly comprises the several steps and the relation of one or more of such steps with respect to each of the others, and the apparatus embodying features of instruction, combinations of elements and arrangement of parts that are adapted to affect such steps, or as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
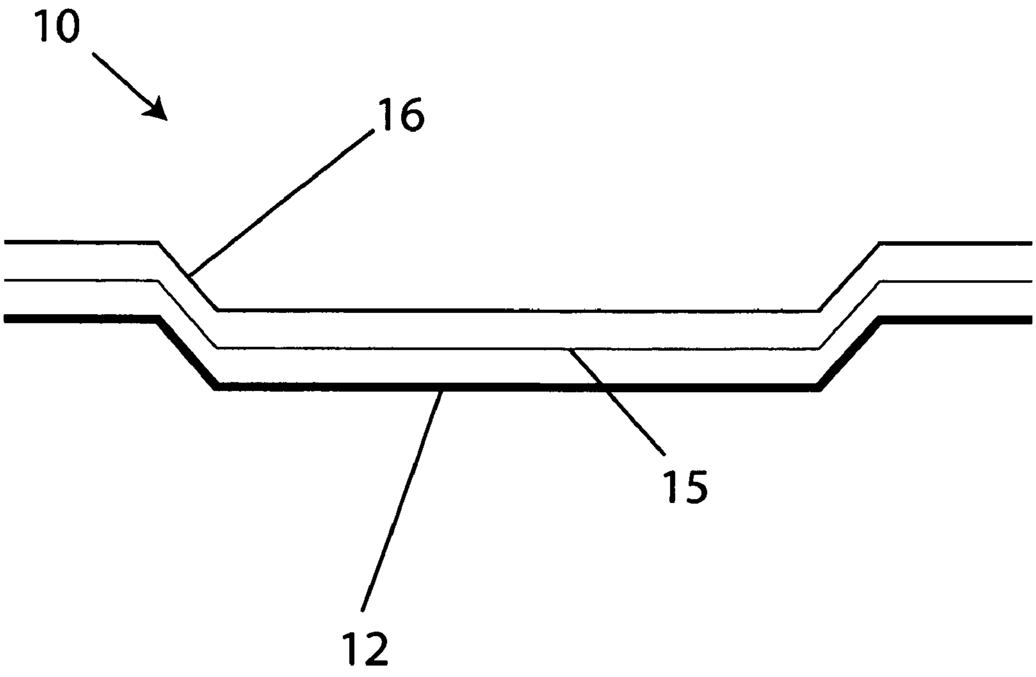
FIG. 1 is a cross-section depicting a plate constructed in accordance with a first embodiment of the invention.

Referring first to FIG. 1, a cross-section of a plate constructed in accordance with a first embodiment of the invention is shown. As is shown in FIG. 1, a plate 10 comprises a substrate 12, an outer coating film 16 having an image 15 printed (preferably) thereon. Substrate 12 is formed of any appropriate disposable plate material, and may comprise Styrofoam™, BioMax™, paperboard, cardboard, EarthShell™, PVC (polyvinylchloride), PET (polyester), HIPS (High Impact Polystyrene), PVDC, HDPE, Polypropylene, molded fiberboard or any other material used to form a plate, clamshell, beverage container, or other tableware item. These materials may be disposable or permanent. While this substrate may be preformed into the shape of a plate or other item, it is also possible that the substrate is provided as a straight sheet, and is molded upon the application of the remainder of the film and images as will be discussed below. Furthermore, if a non-disposable substrate is used, it may be formed to shape before this process begins.

Fixed to substrate 12 is substantially transparent outer-coating film 16. Film 16 is also substantially glossy. Film 16 may comprise PVC, PET, HIPS, PVDC, HDPE, Polypropylene, BioMax™ or the like. This film is provided for carrying an image 15 thereon. Image 15 is preferably a high-quality or distinctive photographic image utilizing chemical photography, but may comprise a digital photograph or the like if sufficient quality can be attained. Thus, image 15 is printed on the film, preferably in a reversed type print on the underside thereof so that upon the placement of film 16 adjacent substrate 12 in a trap printing process, an image is properly viewable to a user of the plate from above. The contents of image 15 will be discussed below. The image may also be printed on substrate 12 and the film applied as a coating.

If applied to the underside of film 16, any type of ink maybe used. The same goes if applied to substrate 12. However, if applied to the outer surface of film 16 (as will be described below) a food-grade ink must be employed. The application processes for applying ink 15 include: digital printing, pad printing, gravure printing, flexographic printing, offset printing, or the like.

Thus, film 16 is provided encasing substrate 12 and image thereby affixing film 16 and image 15 to substrate 12. Film 16 is provided as a food quality material such as approved by the FDA. Therefore, upon application of film 16, plate 10 includes image 15 printed thereon, but is still provided as a food-quality object. Thus, a plate with an image 15 is provided that is still made as a food quality item. While a plate is shown, other objects such as cups, beverage holders, clamshells, other tableware items or the like may be used.

Figure 2:
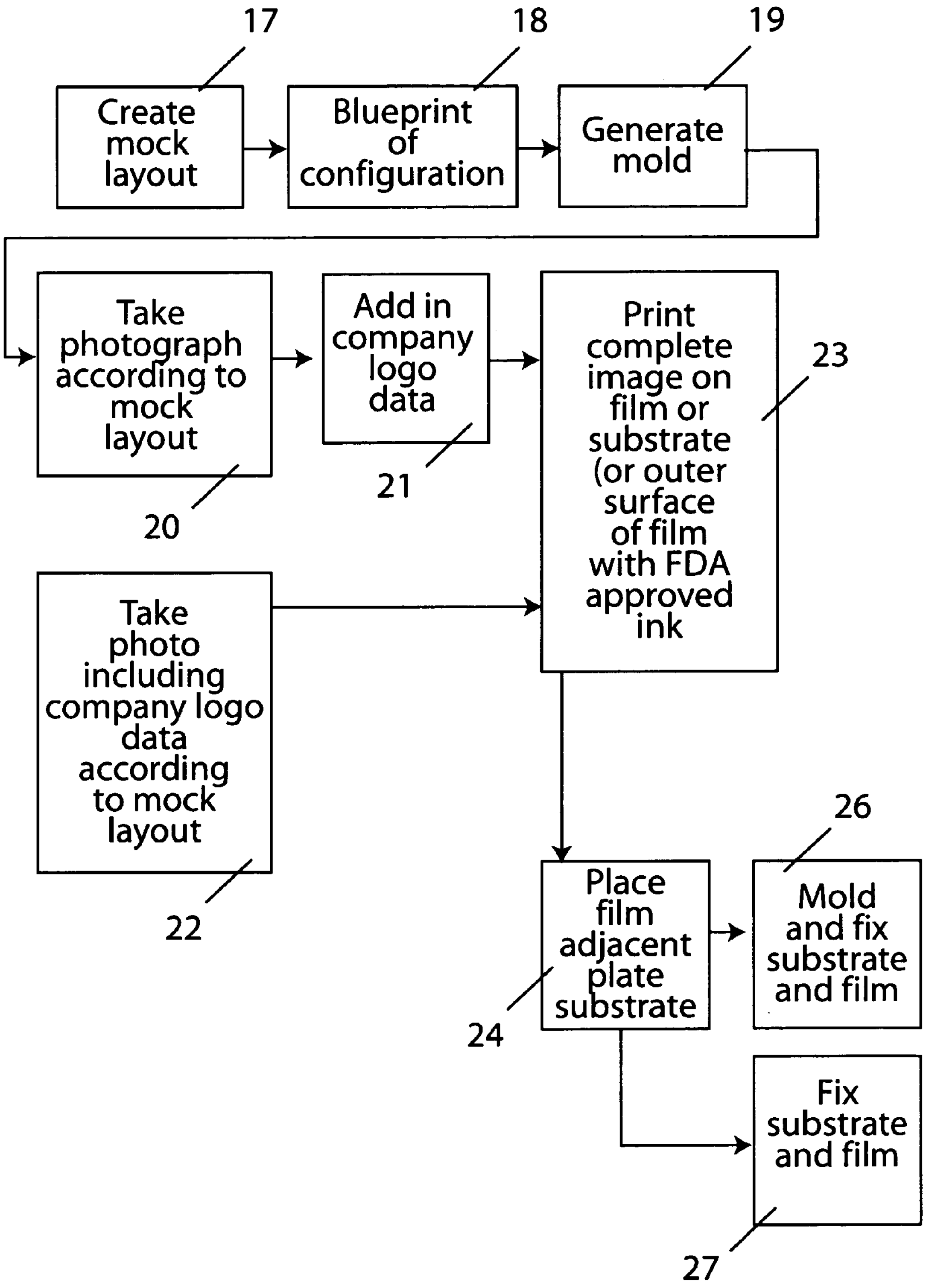
FIG. 2 is a flowchart diagram depicting a preprocess for producing the plate of FIG. 1.

Referring next to FIG. 2, a flowchart depicting a method for constructing a plate such as that depicted in FIG. 1 in accordance with the invention is shown. As is shown in FIG.

2, a mock layout for desired plate design is first created at step 17, and at step 18 a configuration blueprint is created. Next, at step 19 a mold, including a plate shape is generated. This would include the plate, clamshell or beverage container shape, and may comprise cutouts or perforations as desired. Then, at step 20 a high-quality photograph or other printed image of an object designed to be put on the plate according to the mock layout is taken.

At step 21, the company logo data or other advertising data is added ("stripped in") at an appropriate location of the image. This appropriate location is typically a portion of an object contained in the photograph that is subtle, and may or may not be a standard location for such a logo. Of course, multiple logos on a single plate may be used. The precise position of this logo material will be discussed below. The logo data may also be provided as part of the original photograph.

A company logo data may be provided to a manufacturing process as a hard copy which may then be scanned and digitally integrated into the photograph, or may be provided as a digital file which is similarly incorporated into the digital photograph. Furthermore, in accordance with an additional embodiment of the invention, it would be possible to allow users to order such a photograph with logo data over the Internet or other computerized network. Thus, a user might log on to a particular website, and transmit a scan or a digital photo thereto. Alternatively, a photo could be selected from a store at the website. Thereafter, company or other individualized data can be selected or designated and placed by a user. Upon completion of the designed process, the user is prompted to selected particular number of plates to be produced, and these plates are then produced and sent to a user.

This procedure may be beneficial if a user wishes to have plates for a particular event, such as a sports party, bridal shower, birthday, anniversary or the like. Thus, it would be possible for a user to request a personalized photographic plate with individual data, or logo data placed thereon. Furthermore, this individual might select a particular number of plates for a promotional lunch, picnic or the like for a particular company, thereby allowing the logo data to further advertise the name of the company.

After the photograph is completed, and includes the desired advertising data after step 21 or step 22, the complete image is printed on a film at step 23. This is image 15 being printed on the reverse side of film 16 as shown in FIG. 1. Typically, this image is printed in reverse so that upon viewing of the image from the side of the film not receiving the printing, a proper image is viewed. Alternatively, this image may be printed directly on the substrate, or even on the outside of the film, as described above. After printed on the film, this film is placed adjacent plate substrate 12 at step 24. This film is therefore placed in an appropriate location, as it will be positioned in the final product. Thereafter, at step 26, if the plate substrate was previously provided as a non-molded piece (or other material not yet formed into a plate or other shape), the plate is formed according to the generated design and the film and image are affixed thereto in either a single pressing step, or multiple steps as necessary depending upon the forming process. Alternatively, if the plate provided at step 24 was already formed into the design form, the film and image are affixed together without the requirement of pressing a plate formed out of the substrate.

The forming process may employ known processes that result in a high-gloss outer surface for the product. These processes include hydroforming, thermoforming, vacuum-forming, baked batter forming, or molded fiberboard (using a batter or pulp).

Additionally, compensation may be employed to ensure an undistorted view of the image after formation. Thus, by choosing only a shallow angle for the sidewall, distortion is minimized. Furthermore, the image could be pre-distorted to account for distortion that will take place upon formation. Thus, after formation, an undistorted image will be presented.

Figure 3:
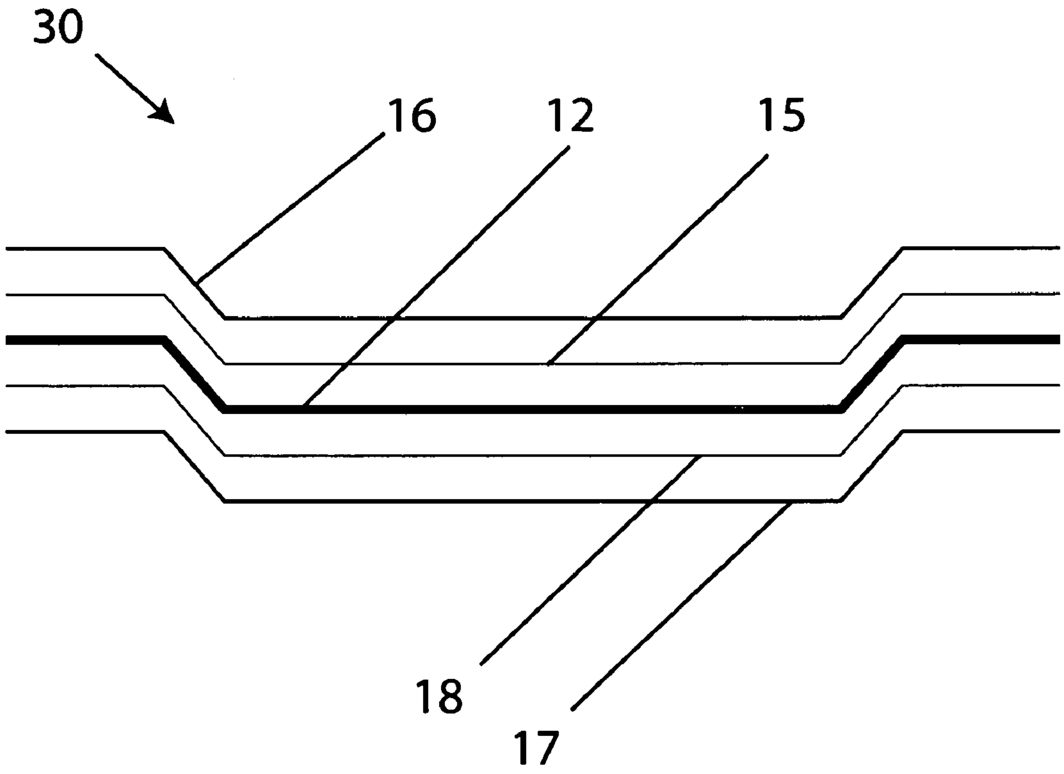
FIG. 3 is a cross-section depicting a plate constructed in accordance with a second embodiment of the invention.

Referring next to FIG. 3, a plate constructed in accordance to the second embodiment of the invention is shown. Plate 30 shown in FIG. 3 includes elements similar to that of plate 1, with an additional film 17 having photograph or image 18 printed thereon. Specifically, in accordance with the invention, rather than simply providing artwork on a single side of a plate, it is also possible to provide artwork or other material on the second, lower side of plate 30 as shown in FIG. 3. Thus, in this feature, a photograph or the like 18 is printed onto a film 17 and is placed on the under side of the substrate. Thereafter, the film is fixed to the lower side of substrate 12 of plate 30 similarly to the manner in which film 16 is fixed to the upper surface of substrate 12 of plate 30.

While this image 18 provided on substrate 17 may comprise further artwork, pictures, icons or the like in a preferred embodiment, this material comprises one or more open-ended questions or provocative statement evoking an opinionated response. These questions may be based on a topic related to the depicted artwork, or alternatively may be based on any other category or subject. Furthermore, these questions may be formed in conjunction with one or more perforations set in the plate formed in accordance with the generated mold. By providing an open-ended question generating an opinionated response on the lower side surface of the plate, it is possible to facilitate conversations in places or locations where users may or may not know each other and may desire help in beginning conversations. In addition to providing open-ended questions, close-ended questions with specific answers may be provided based upon a particular subject, category, affiliated or unaffiliated with the artwork or the like.

The construction process for the manufacture of the plate at FIG. 3 will not be discussed separate from the construction of FIG. 2. The only difference is that at step 23, instead of printing a single complete image on film, an image is printed on two films, each of these films is placed in the appropriate position, either above or below the plate substrate, and are fixed thereto. Therefore, the steps taken are the same, with the use of two films and images rather than simply one.

Figure 4:
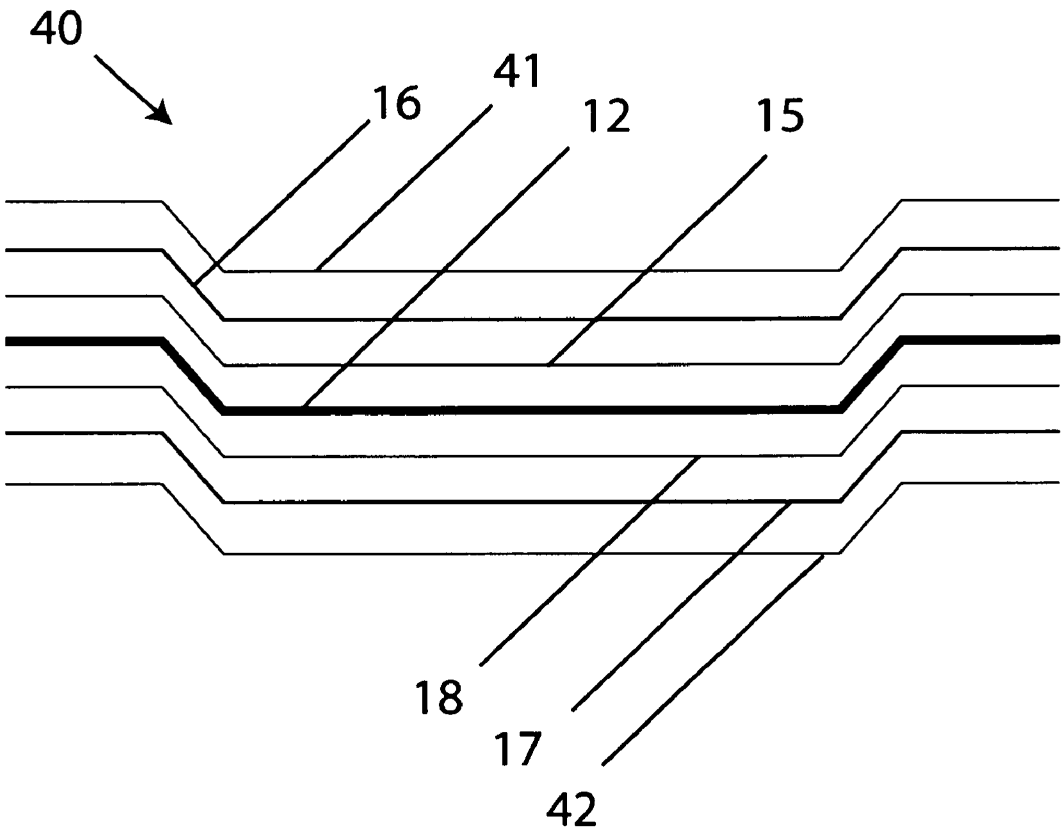
FIG. 4 is a cross-section depicting a plate constructed in accordance with a third embodiment of the invention.

Referring next to FIG. 4, a plate 40 constructed in accordance with a third embodiment of the invention is shown. Plate 40 includes all of the elements of plate 30 of FIG. 3, and further comprises outer image layers 41 and 42 formed on the outside of film layers 16 and 17, respectively. As noted above, the ink forming these images is of an approved food grade. This type of process may be desirable if a base image is printed under the film, and personalized information is printed on the outside of the film. The logo information may also be printed on the outside surface of the film to allow for easier personalization and a reduction of cost for small lot sizes. The process of production is similar to the procedure in FIG. 2, with the addition of a printing step for the outer surface of both the upper and lower films.

While the tabs have been described as containing questions, artwork or the like, discount coupons, advertising promotions, lottery chances, game pieces, or any other desirable information may be included thereon.

Figure 5A:
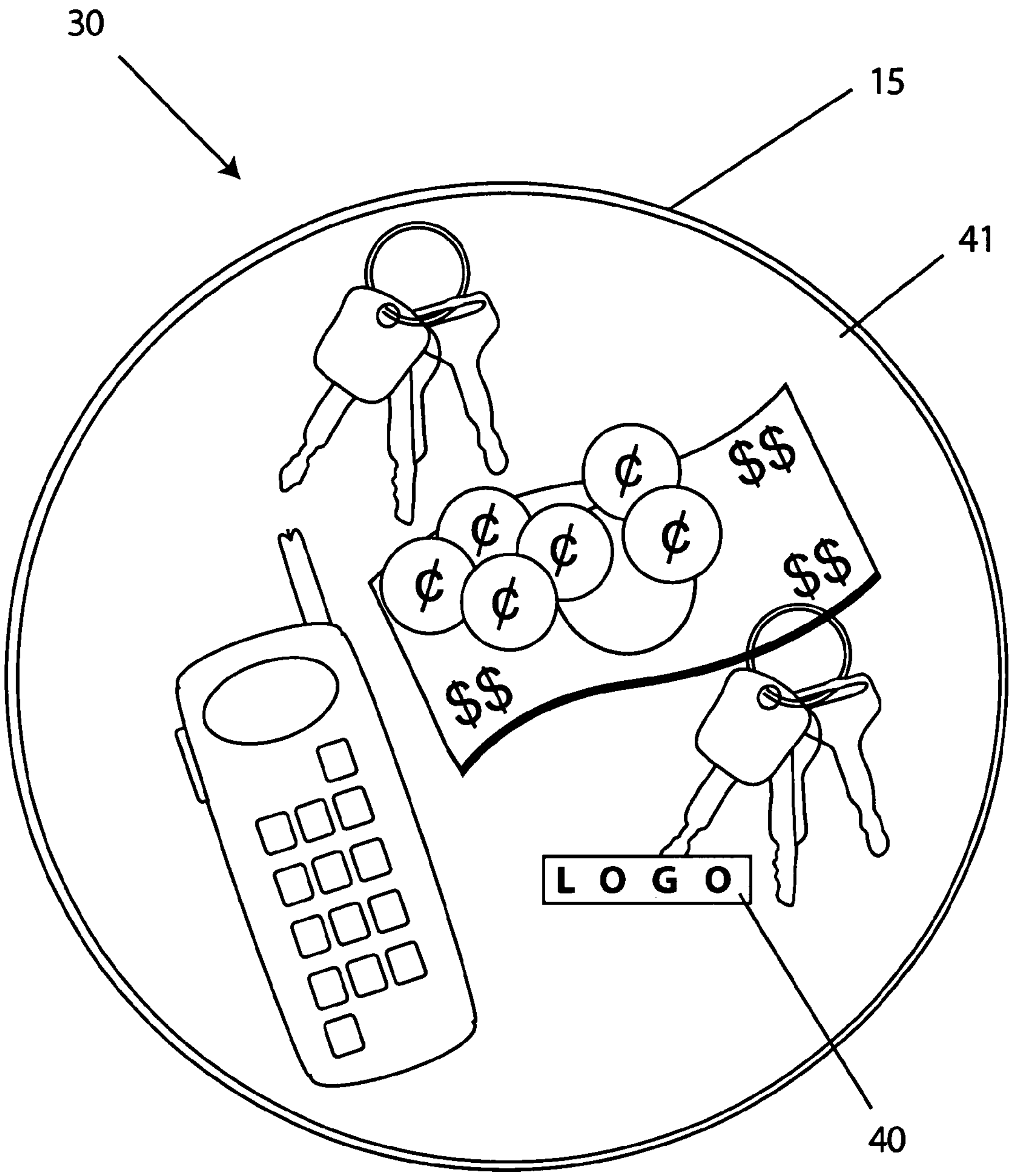
FIGS. 5A–12B depict various plates constructed in accordance with the invention.
Figure 5B:
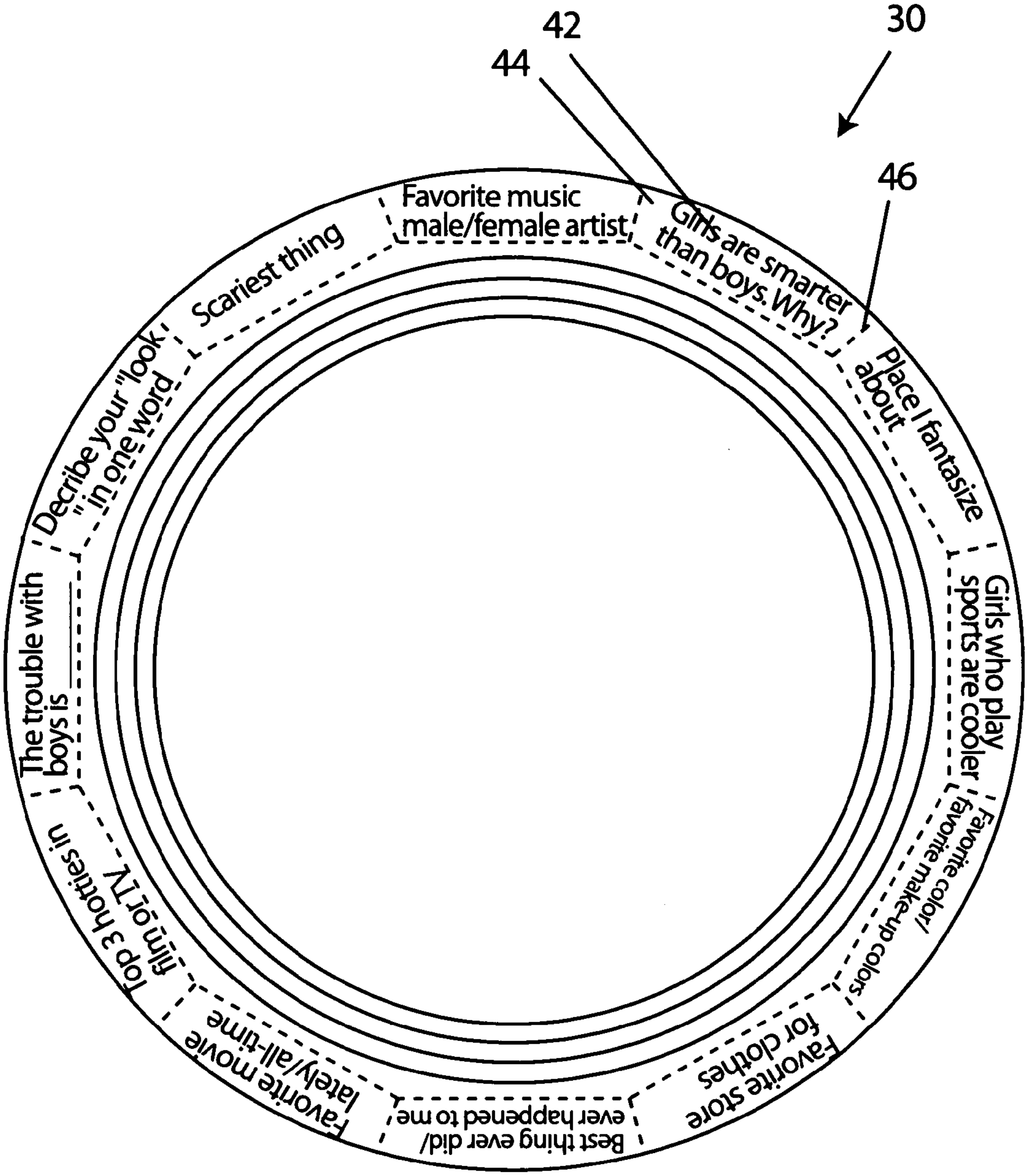
Figure 6A:
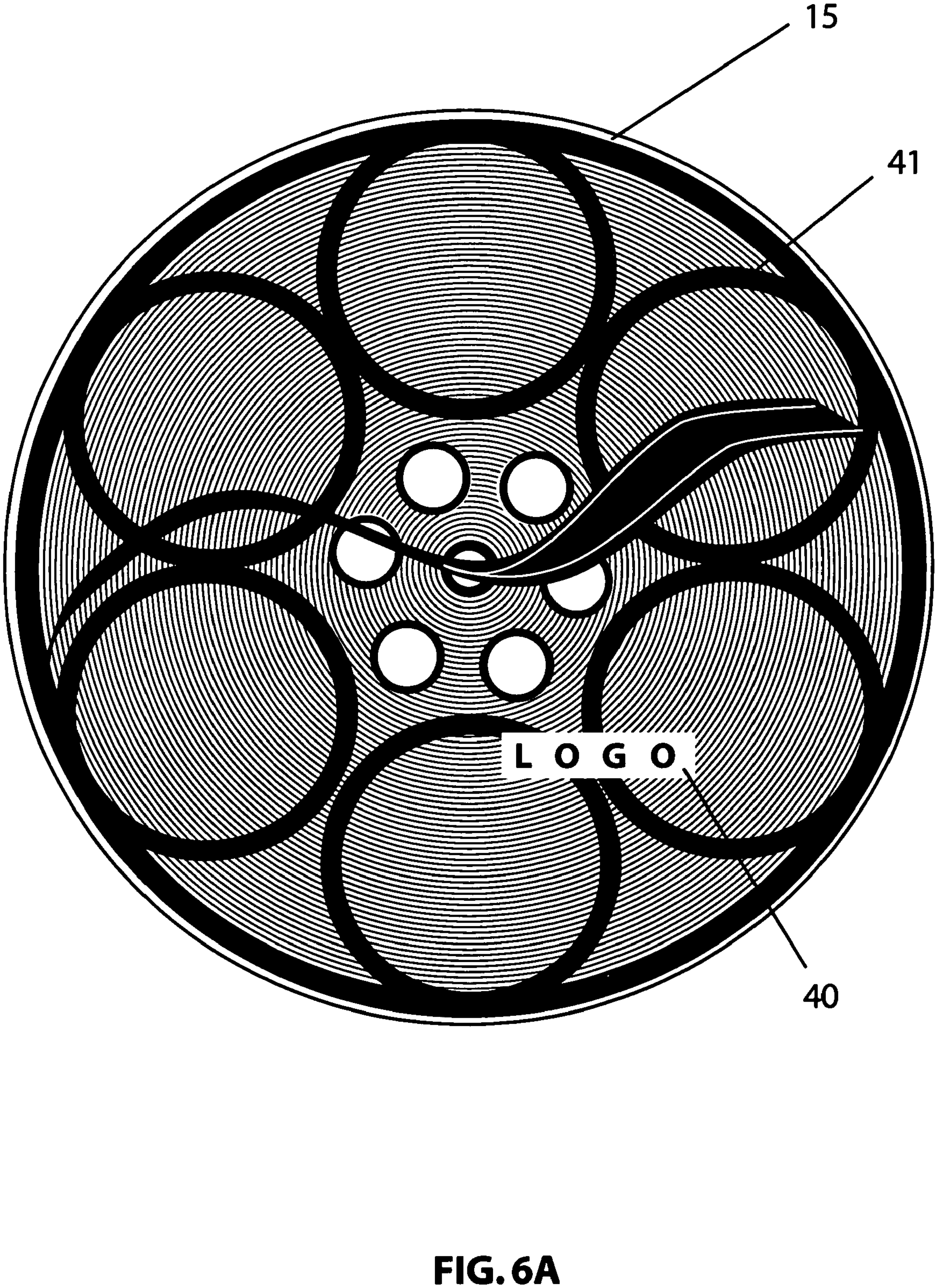
Figure 6B:
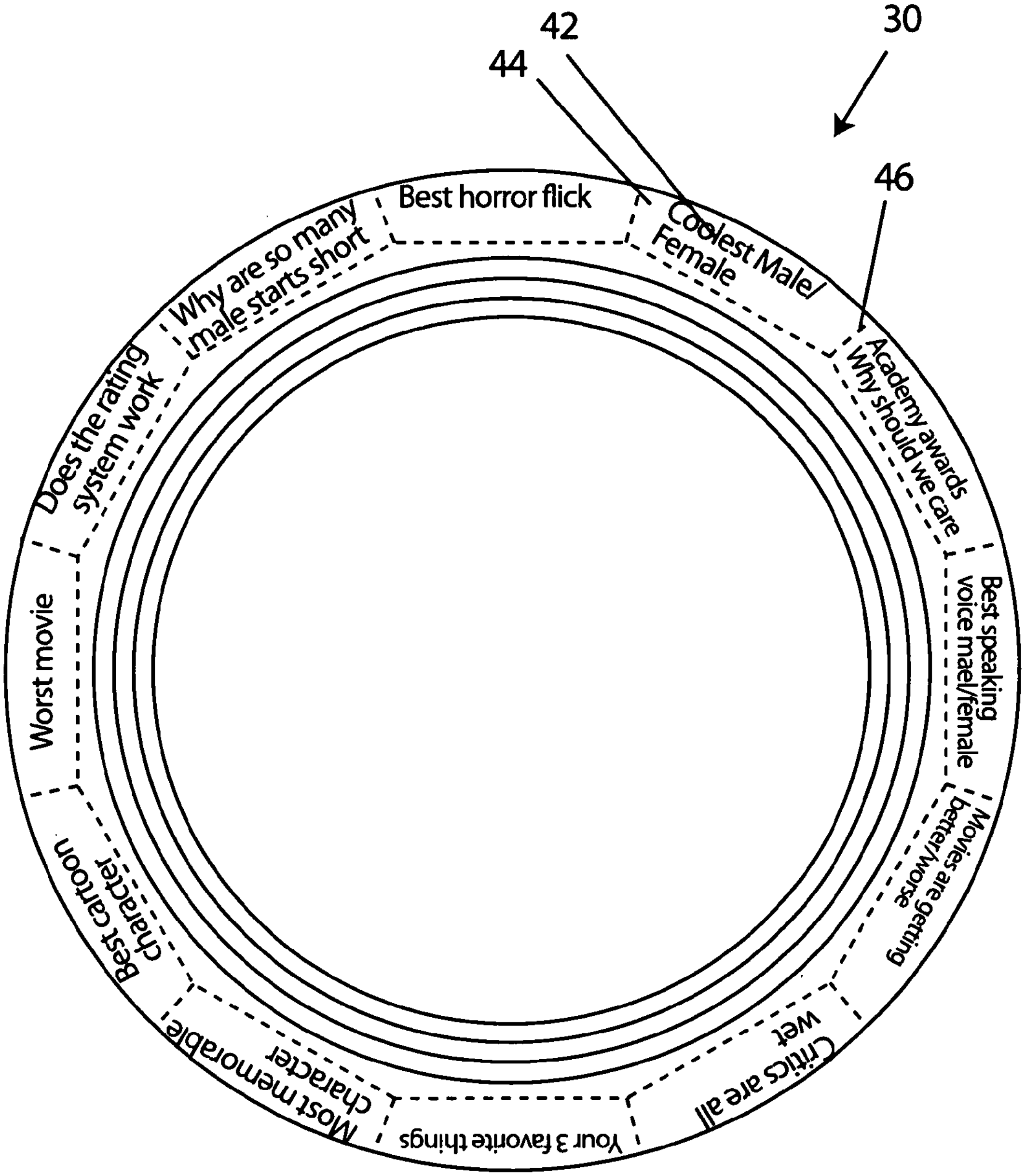
Figure 7A:
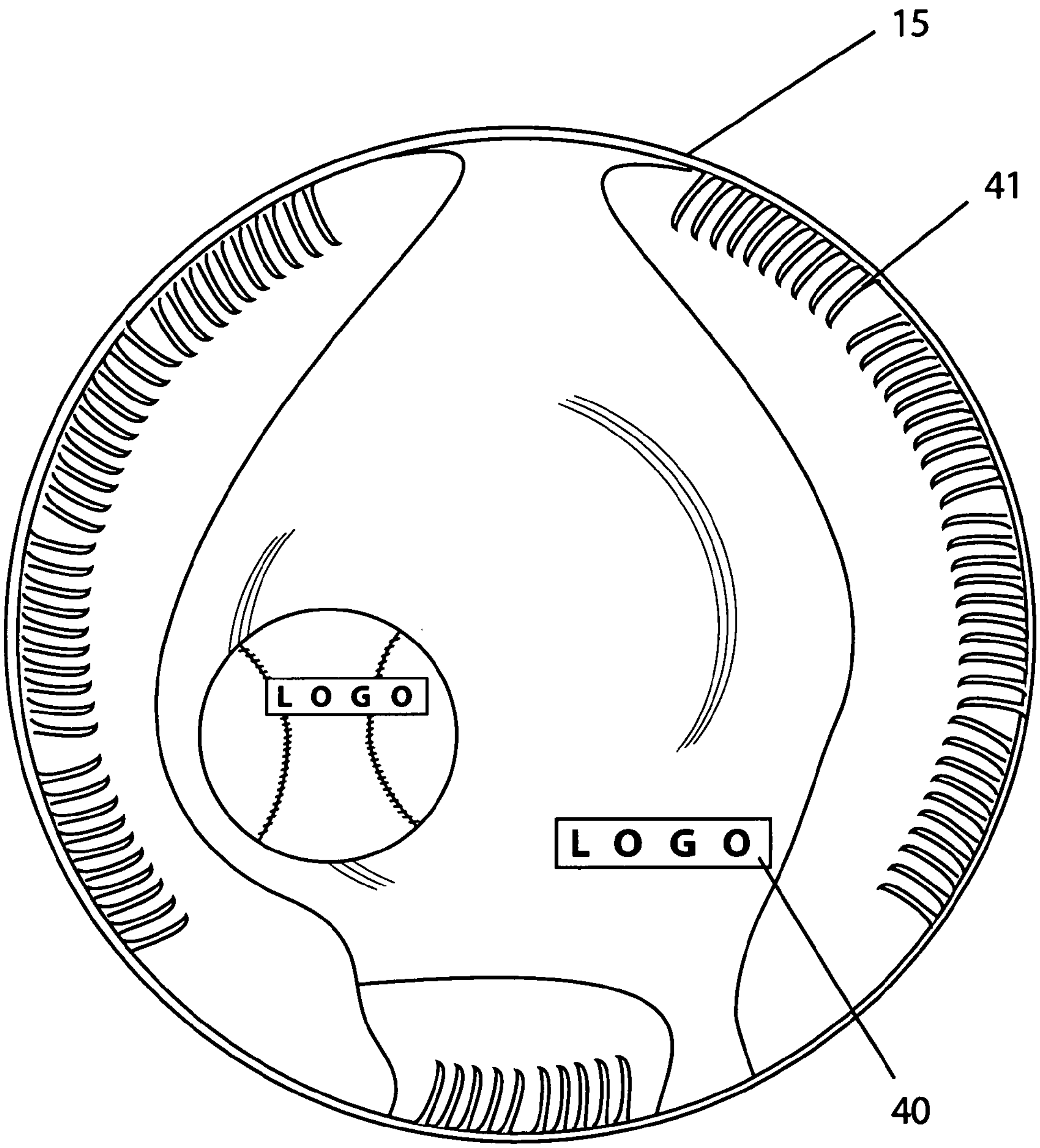
Figure 7B:
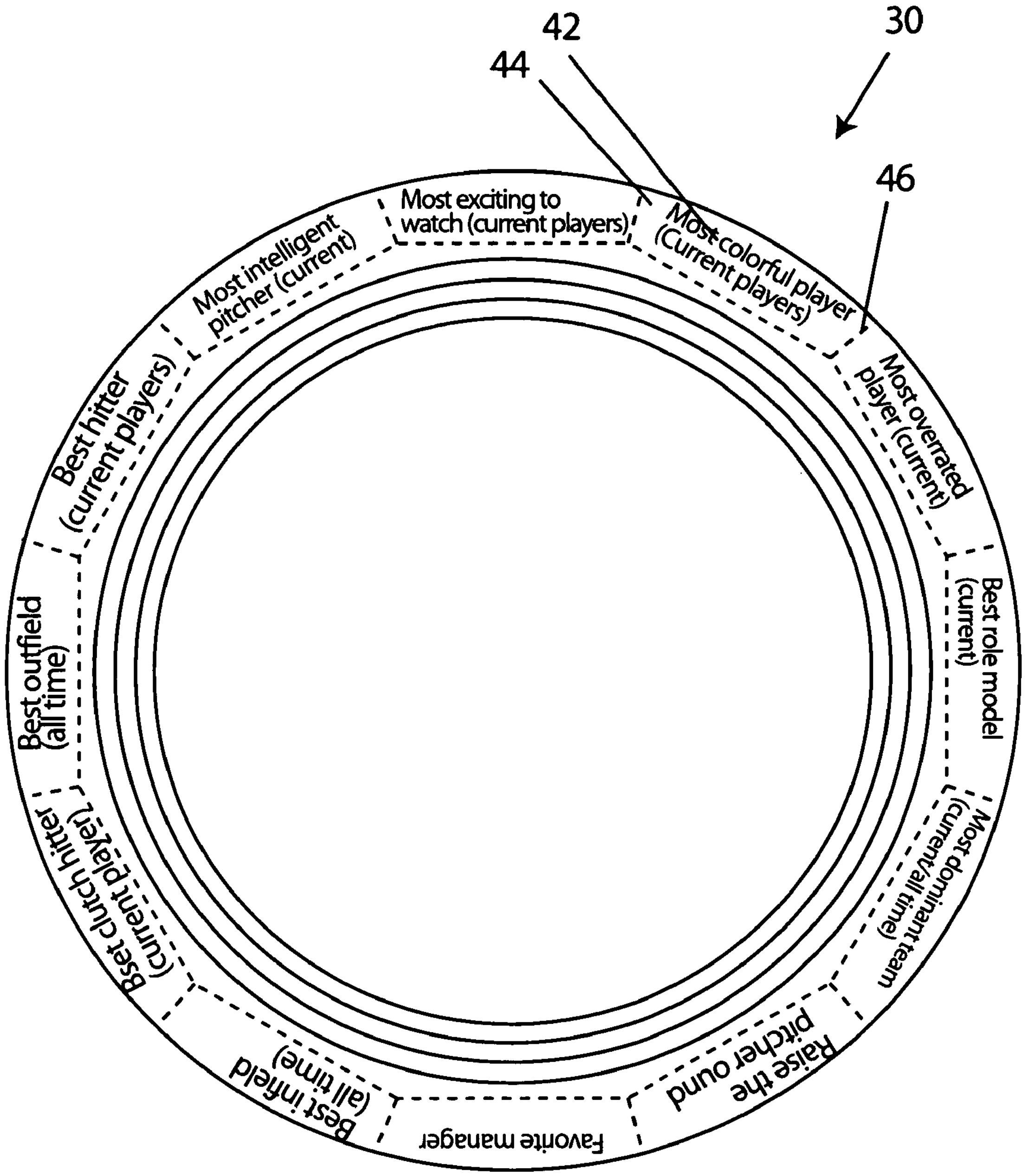
Figure 8A:
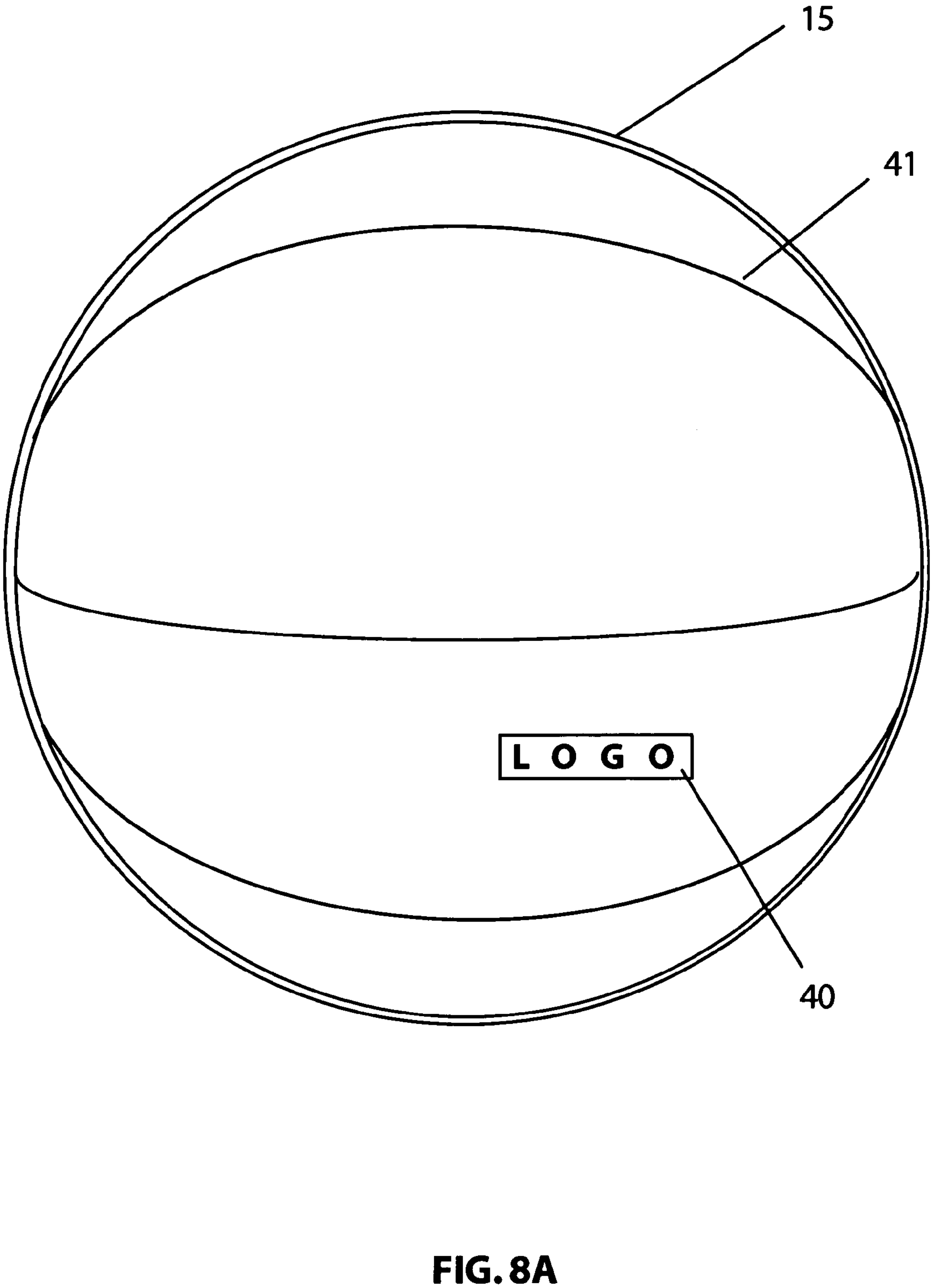
Figure 8B:
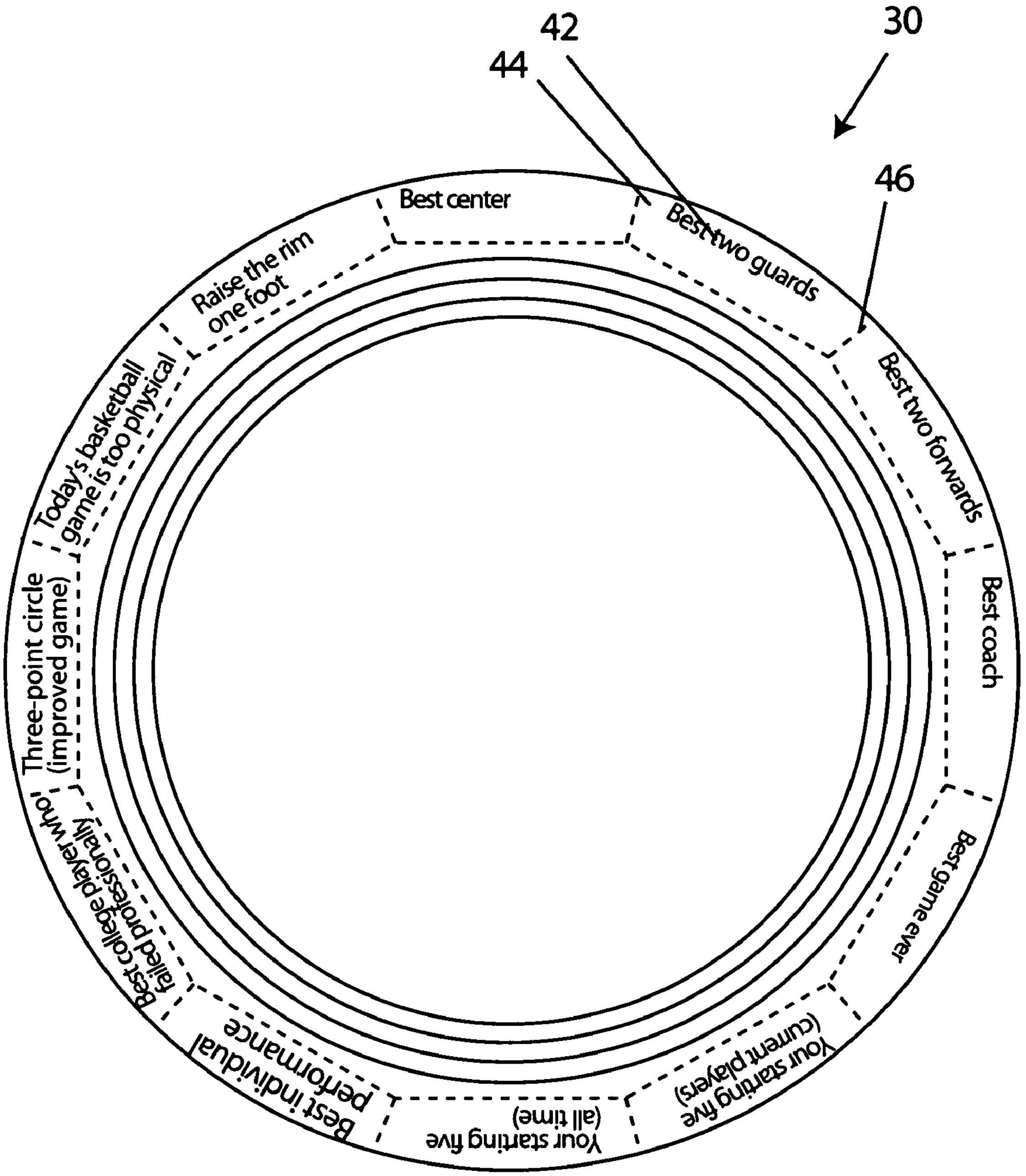
Figure 9A:
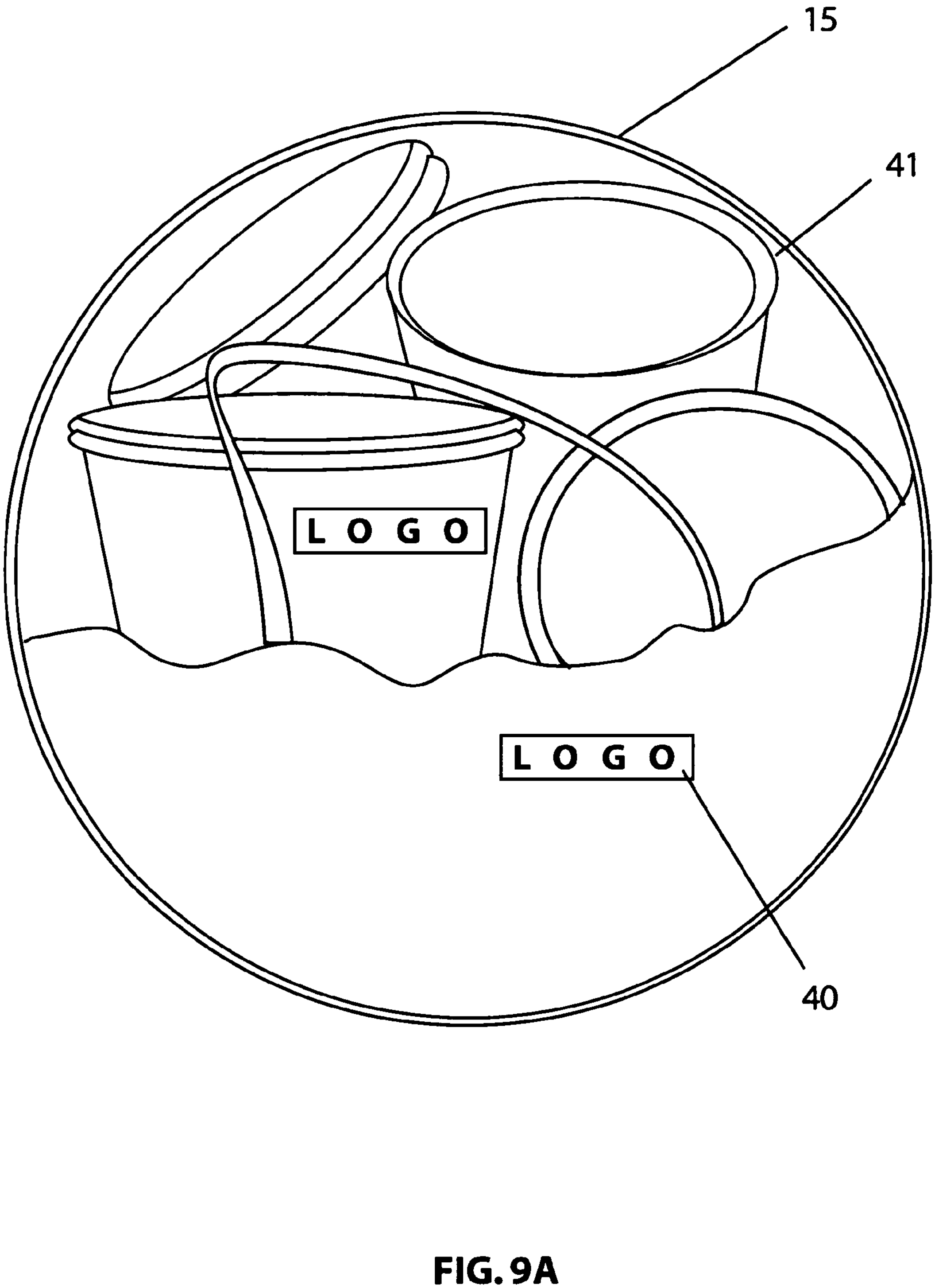
Figure 9B:
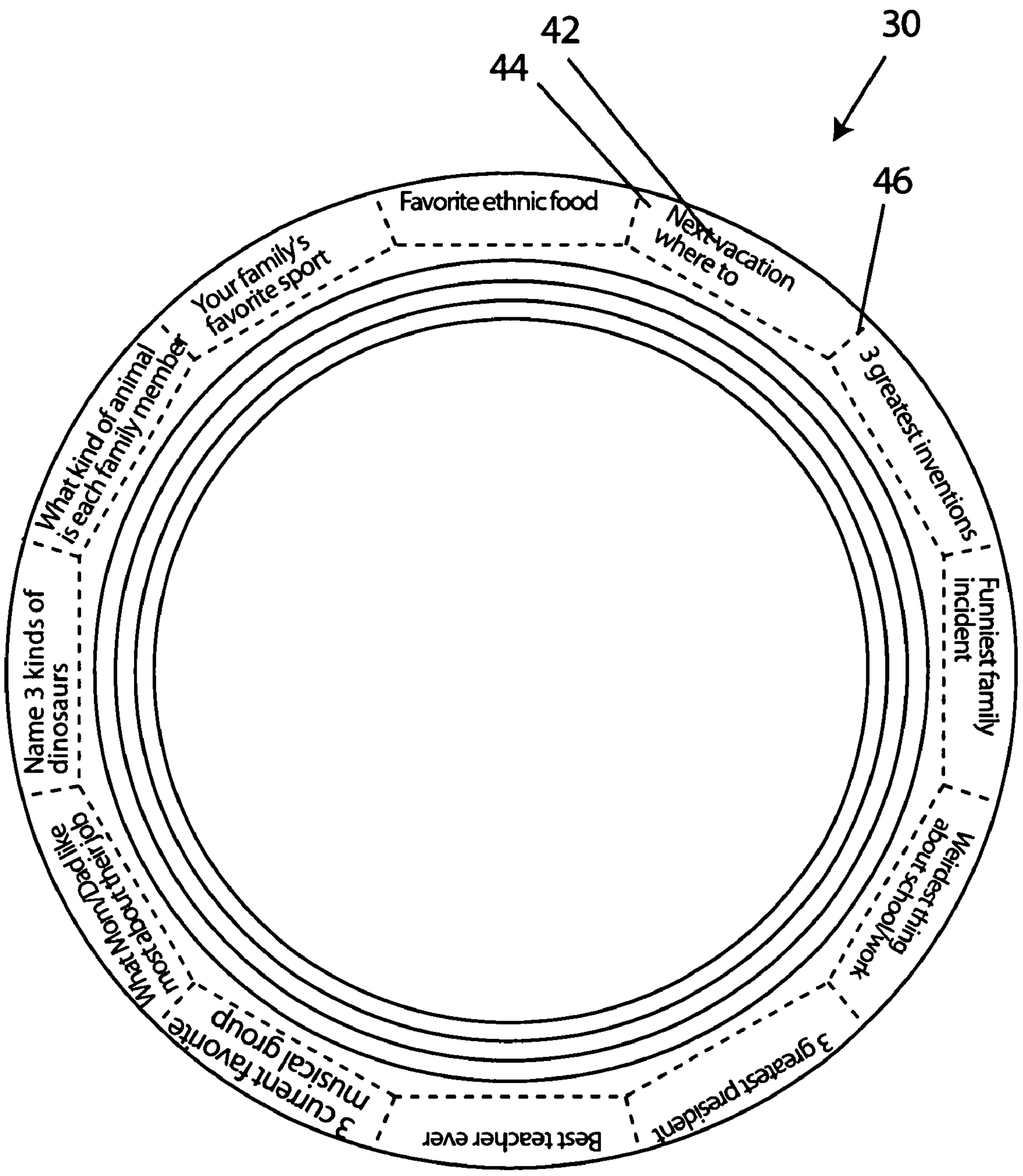
Figure 10A:
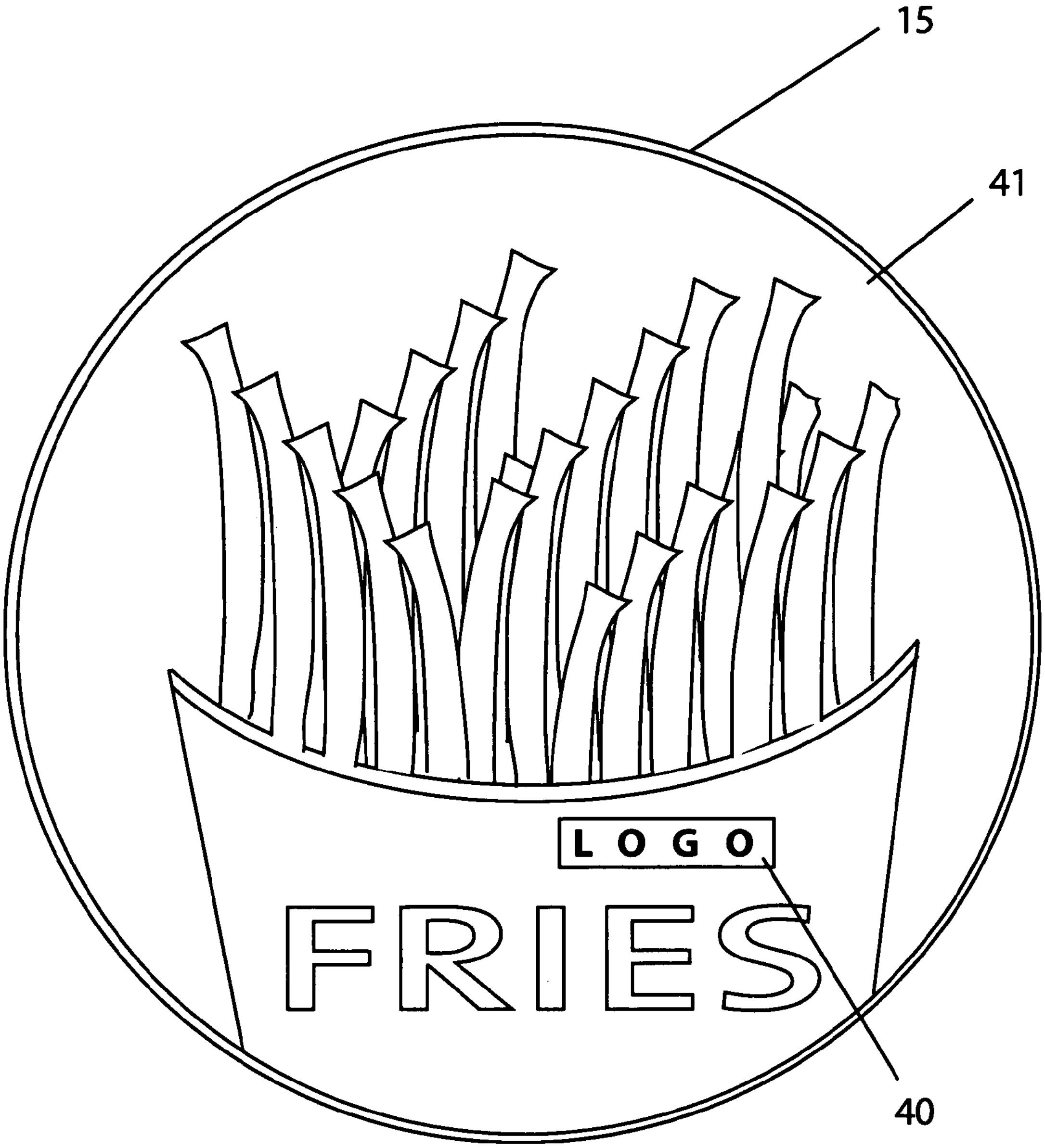
Figure 10B:
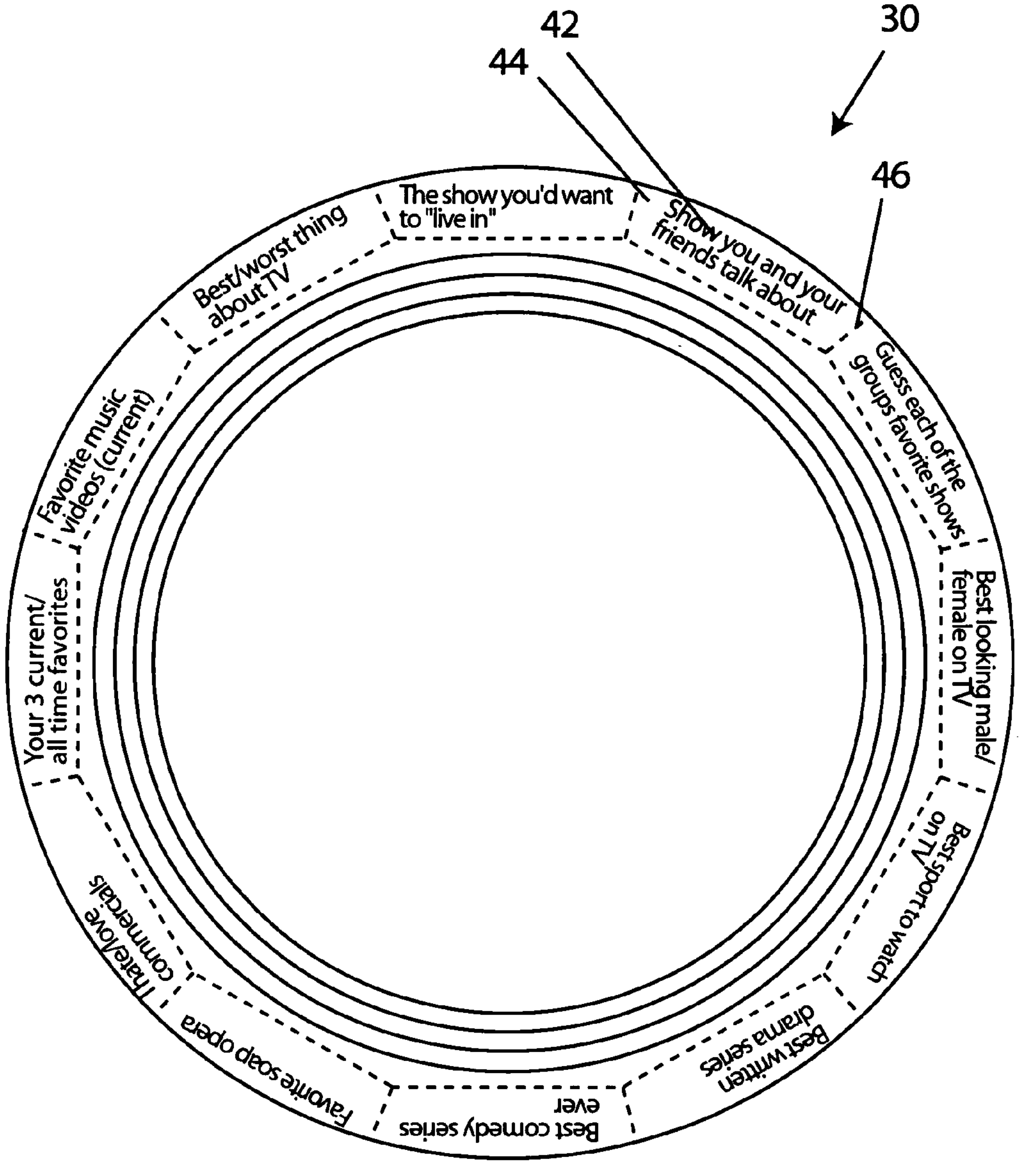
Figure 11A:
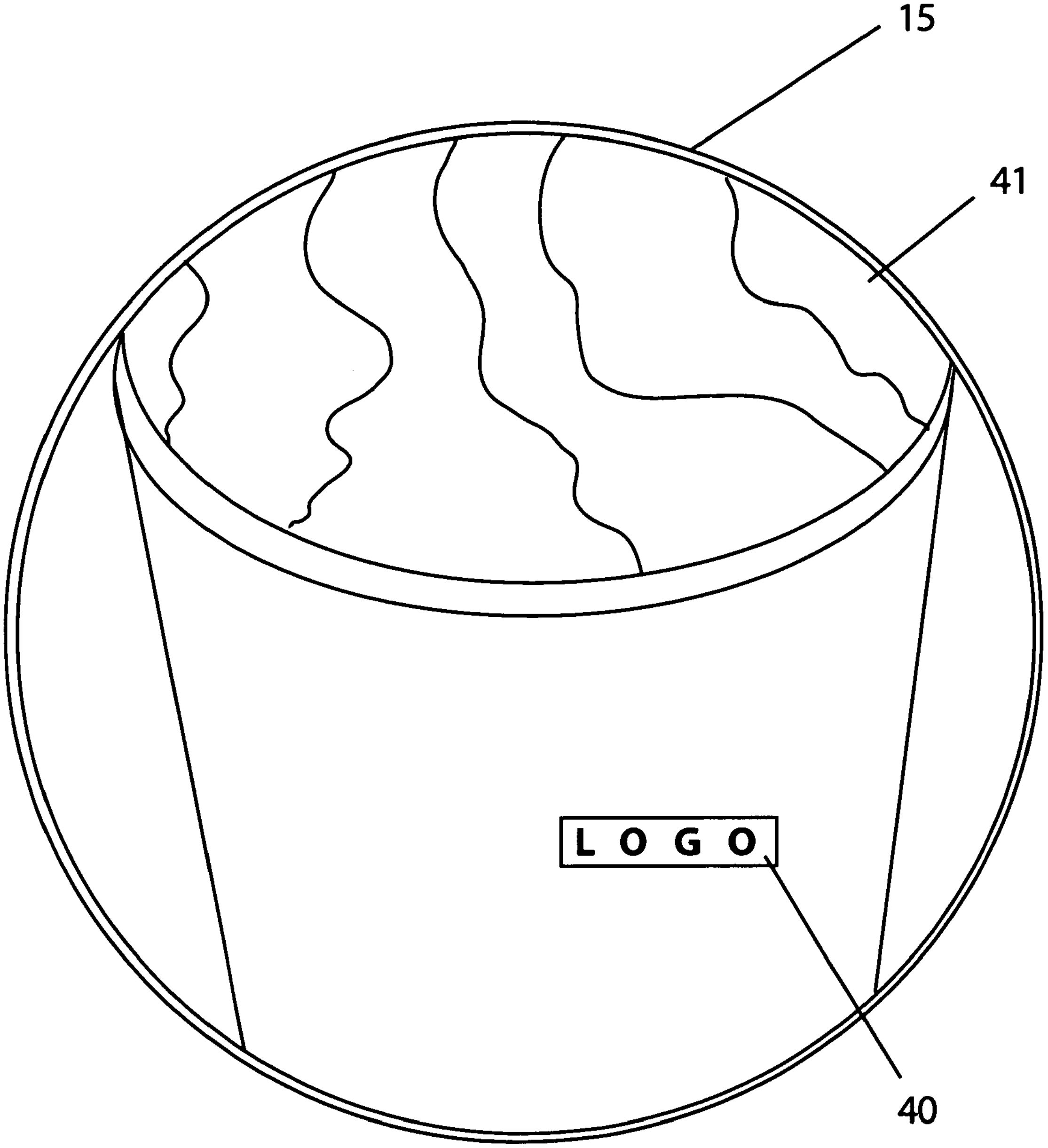
Figure 11B:
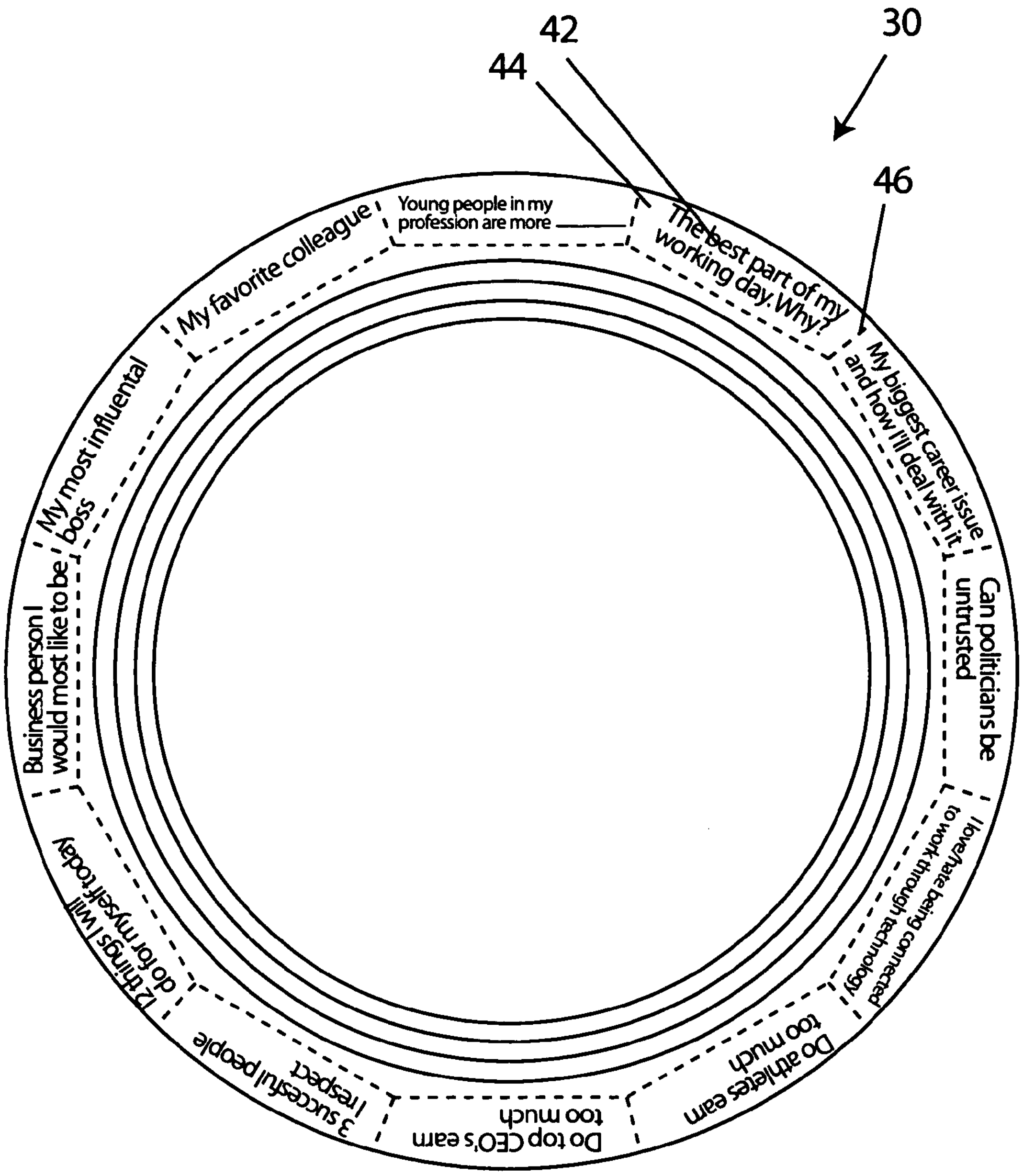
Figure 12A:
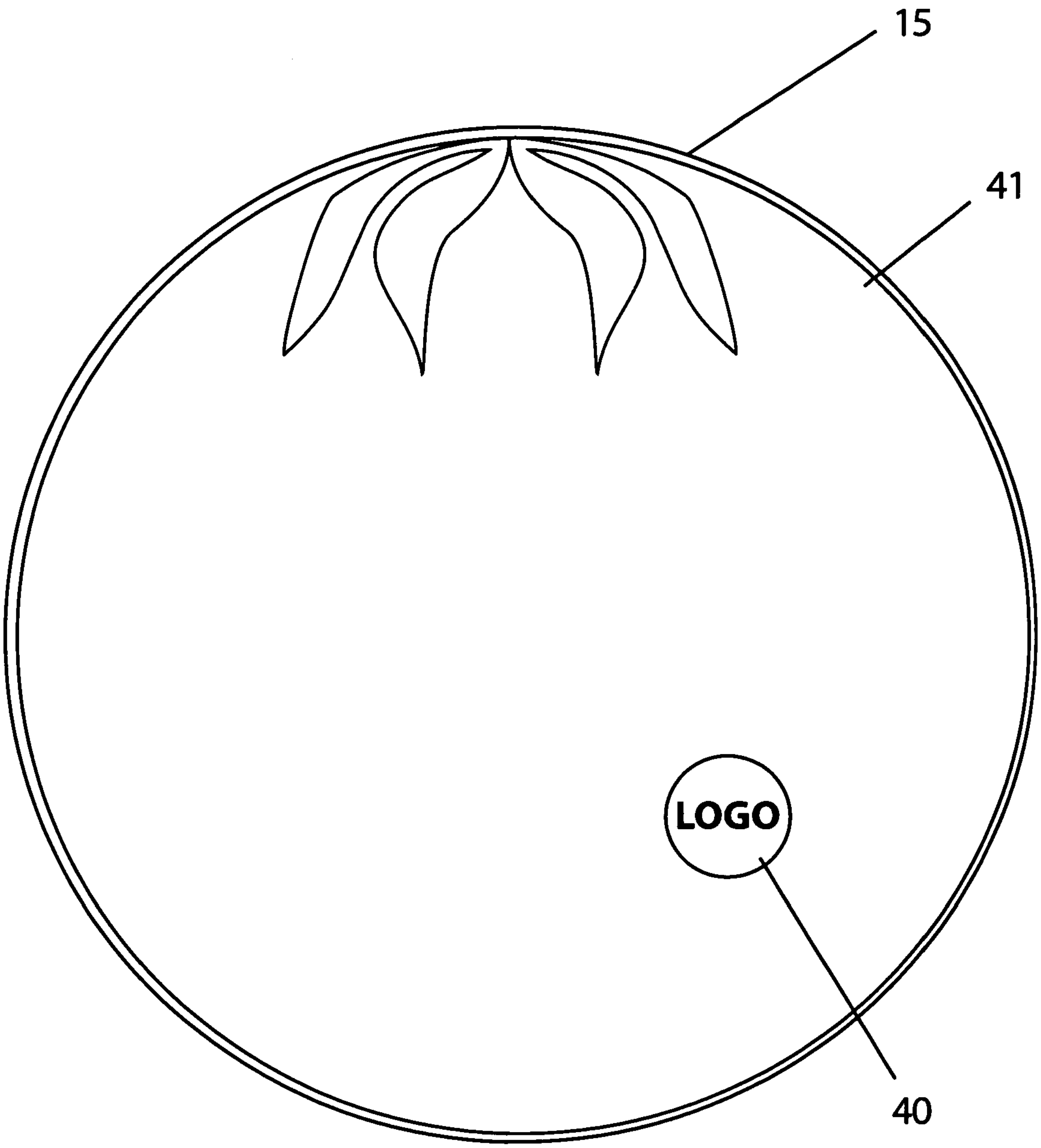
Figure 12B:
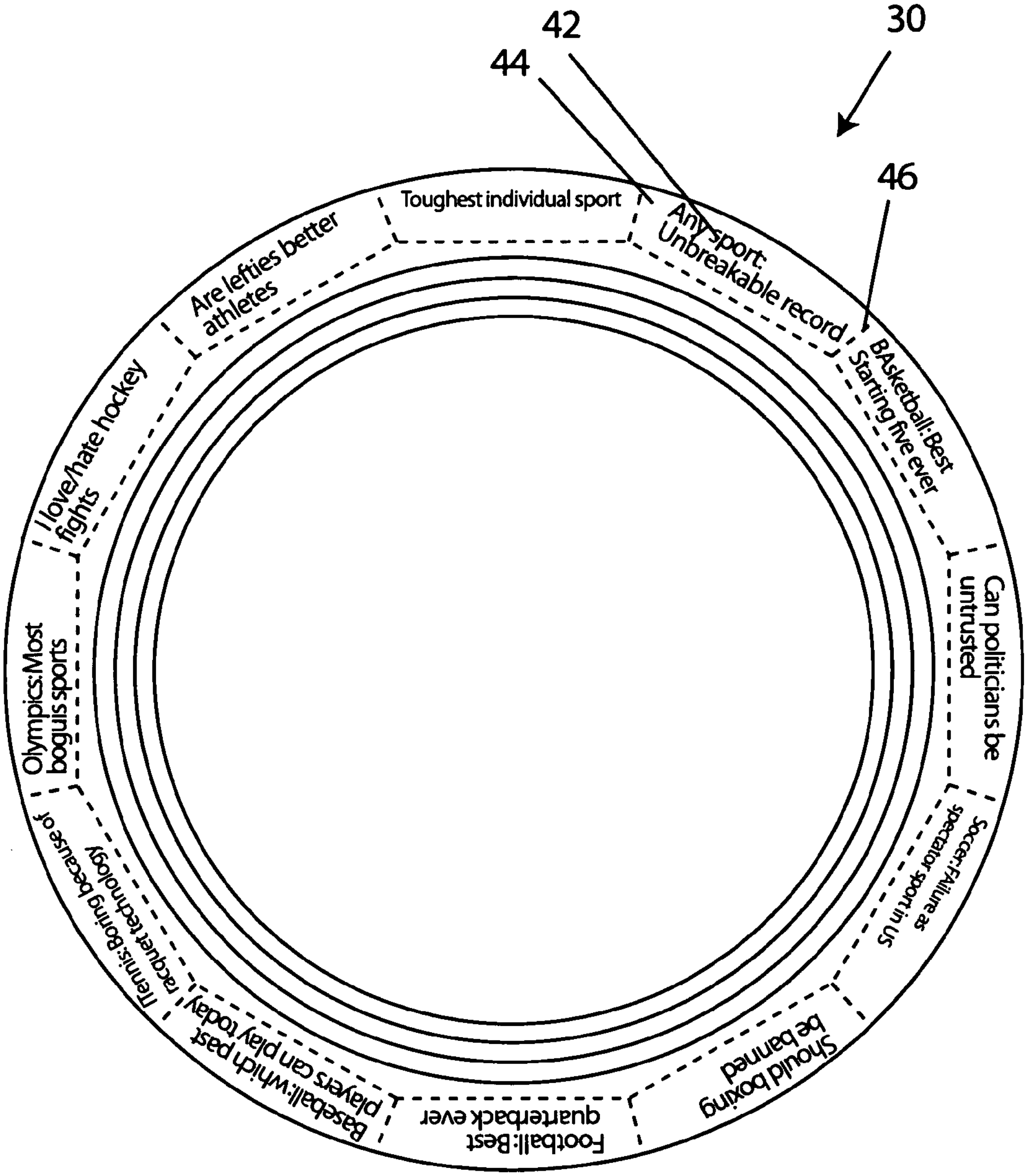

Referring next to FIGS. 5A and 5B, a plate constructed in accordance with the invention is shown. As is shown is FIG. 5A, an image 15 is maintained on a plate 30 as described above. As is further shown, image 15 comprises a plurality of individual objects 41 that might be maintained within a purse, for example. Image 15 may cover merely the center lower section, or may alternatively cover the rim side portions of the plate. Within the purse is shown money, a cellular telephone, a key, key chains, and various make-up items. As is also shown, a company logo 40 is placed, not as simply a marquee along the image, but rather as an integral part of an object of the image, in this case, a key-chain. In this manner, it is possible to provide advertising that appears subtle to a user, as if it would be an appropriate object to be enclosed therein.

Referring next to FIG. 5B, the under side of the same plate is depicted. The under side of this plate depicts a number of open-ended opinion evoking questions that may be viewed by a user. As is shown in FIG. 5B, a plurality of opinion-evoking statements are made, and are available in tear-off spots (in accordance with perforations 46) so that the user may remove each tab and read it without disrupting the position of the plate 30.

FIGS. 6A through 12B show additional art and question pairs that may be provided in accordance with the invention. As is evident from these pairs, at certain times, the questions provided are related to a topic suggested by the artwork, while in other cases, the questions or statements are suggested in accordance with the location a user might use the particular item, or the audience that might use a particular piece of artwork. Reference numbers referring to elements similar to those in FIGS. 5A and 5B are used throughout.

In any event, the common thread in each of these figures is that the logo is placed in an inconspicuous, and seemingly normal or unobtrusive location in the image.

The placement of a particular logo is determined in accordance with the invention. It is the placement of such a logo in an unobtrusive and "expected" location (by a consumer) on a high-quality image on a utilitarian object, or tableware that allows for the overall effectiveness of the product. Thus, the image is fixed to a plate in a manner previously described. Using a high resolution photograph and digital combining technique to include a company logo as desired, by the advertising method and apparatus provided allow for an advertiser to present his or her logo in an inconspicuous manner to various users.

Figure 13A:
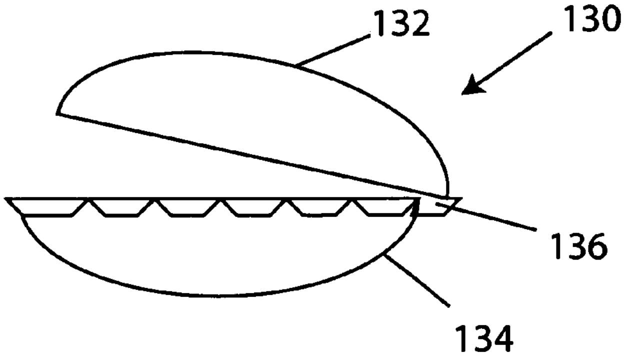
FIGS. 13A–13D depict various views of a clamshell constructed in accordance with the invention.
Figure 13B:
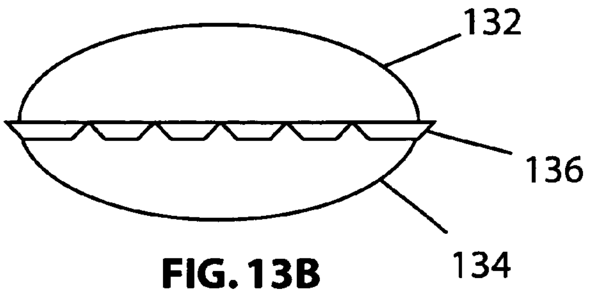
Figure 13C:
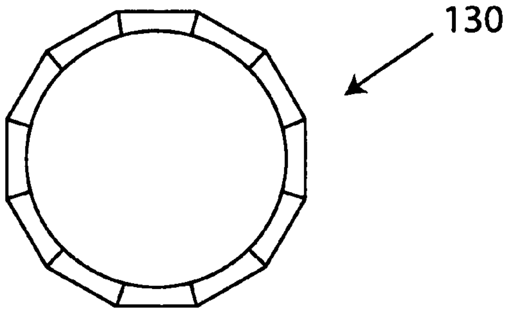
Figure 13D:
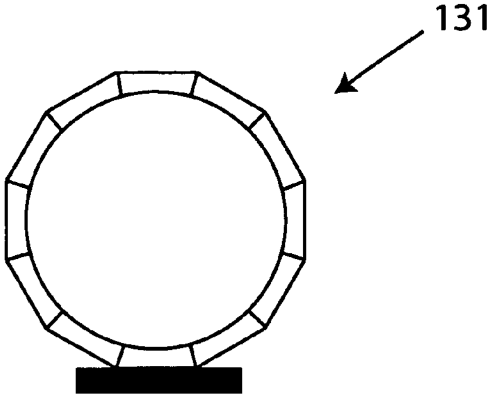

In addition to providing a plate or beverage container, a clamshell may be provided. Therefore, as is shown in FIGS. 13A–13D, a food clamshell constructed in accordance with the invention is shown. FIG. 13A depicts a clamshell 130 comprising an upper portion 132 and a lower portion 134. Lower portion 134 further comprises tabs 136 fixed thereto, or formed integrally therewith. Of course, tabs 136 could be formed attached to upper portion 132 as well. As is further shown in FIG. 13B, similarly to the plate embodiment noted above, preferably, open-ended questions are positioned on an underside of tabs 136. FIGS. 13C and 13D depict clamshell 130 formed as a circle or oval (131). Any shape may be used.

Clamshell 130 is formed in a manner similar to that of the plate embodiments noted above, although the top and bottom may be formed together. Thus, all of the discussion of layers and forming processes noted above are equally applicable to the clamshell.

Figure 14:
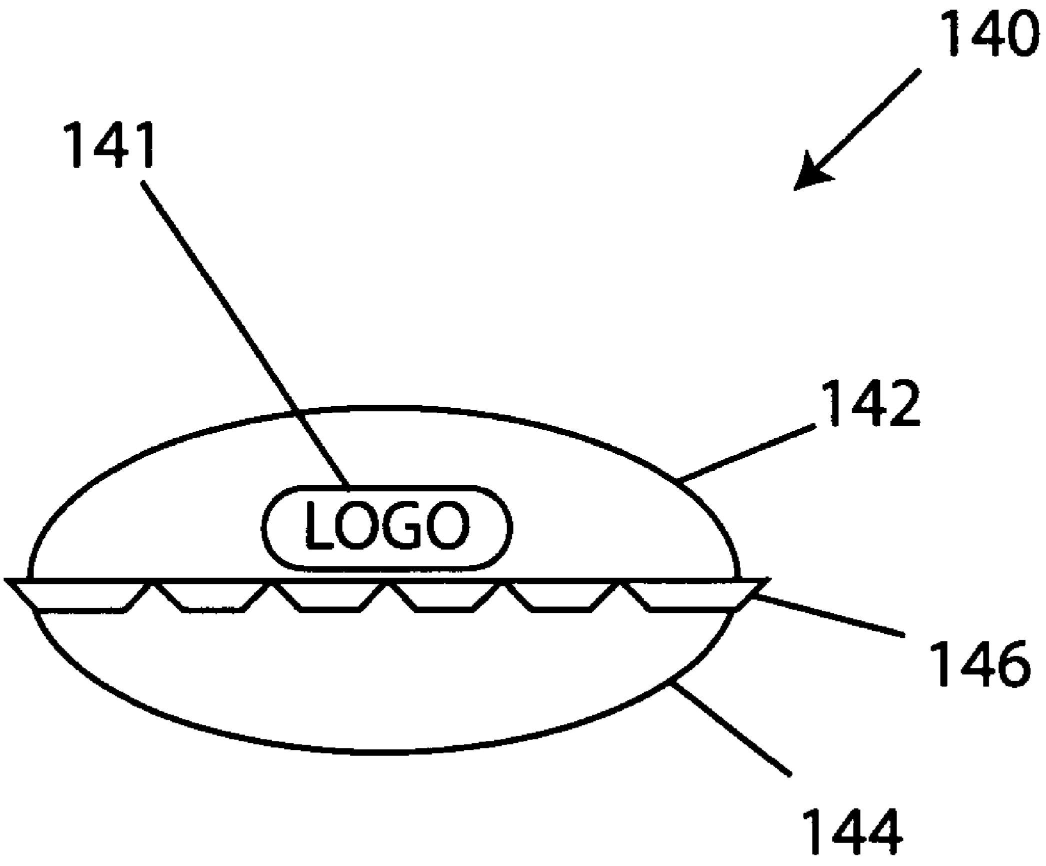
FIG. 14 depicts a further clamshell constructed in accordance with the invention.

As is shown in FIG. 14, artwork may be provided to disguise clamshell 140 as a particular item, in this case a hamburger. Thus a top portion 142 is formed with artwork to look like the top of a bun. Lower portion 144 may be formed to look like the bottom of a bun, and tabs 146 to look like lettuce. Logo 141 is included thereon in a manner similarly to that previously described. In this way, an attractive advertising medium may be generated and employed.

While one particular embodiment is depicted regarding the provision of particular tab structure for the plate, clamshell or other objects in this application, any of the structures presented in U.S. patent application Ser. No. 09/925,443, incorporated herein by reference as noted above, may be employed.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for advertising, comprising the steps of:

generating a high-quality photographic image having one or more image objects therein;

placing one or more advertising data on said one or more image objects of said high-quality photographic image;

printing said high-quality photographic image and said advertising data on a utilitarian tableware object; and fixing a transparent film to said utilitarian tableware object so that said high-quality photographic image and said advertising data are visible to a user, whereby said advertising data appears to be part of said one or more image objects in the high-quality photographic image.

2. The method of claim 1, wherein said utilitarian tableware object is a plate.

3. The method of claim 1, wherein said utilitarian tableware object is a beverage holder or cup/bottle holder.

4. The method of claim 1, wherein said utilitarian object is a clamshell.

5. The method of claim 1, further comprising the steps of:

creating a mock layout of said utilitarian tableware object;

generating a blueprint of said mock layout; and generating a mold or other forming apparatus in accordance with said blueprint.

6. The method of claim 1, wherein said advertising data comprises a company logo.

7. The method of claim 1, wherein said advertising data is added to said high-quality image in accordance with a digital combination technique.

8. A method for advertising comprising the steps of:

generating a high-quality photographic image having one or more image objects therein;

placing one or more advertising data on said one or more image objects of said high-quality photographic image;

printing said high-quality photographic image and said advertising data to the underside of a transparent film before said film is fixed to a utilitarian tableware object; and fixing said transparent film to said utilitarian tableware object so that said high-quality photographic image and said advertising data are visible to a user, whereby said advertising data appears to be part of said one or more image objects in the high-quality photographic image.

9. The method of claim 8, wherein said transparent film is fixed to said utilitarian tableware object in accordance with a step of forming said utilitarian tableware object out of a stock material.

10. The method of claim 1, wherein said utilitarian tableware object is formed of a disposable material.

11. The method of claim 1, wherein said utilitarian tableware object is formed of a permanent material.

12. An apparatus for advertising, comprising:

a high-quality photographic image;

one or more image objects positioned in said high-quality photographic image;

advertising data positioned on said one or more image objects of said high-quality photographic image so that said advertising data appears to be part of said image object;

a utilitarian tableware substrate, said high-quality photographic image and said advertising data being fixed thereto; and a first film, said high-quality photographic image and said advertising data being fixed to an underside of said first film before being fixed to said utilitarian tableware substrate.

13. The apparatus of claim 12, further comprising a second film, a second high-quality photographic image being fixed thereto, said second film being fixed to said utilitarian tableware substrate at a location different from a location at which said first film is fixed.

14. The apparatus of claim 13, wherein said apparatus comprises a disposable plate, said substrate comprises a disposable material, said first film is placed on an upper side of said plate and said second film is placed on a lower side of said plate.

15. The apparatus of claim 14, wherein said second image comprises one or more questions.

16. The apparatus of claim 15, further comprising one or more perforations in said utilitarian tableware substrate defining one or more tear-away tabs, at least one of said questions corresponding in location to said one or more tear-away tabs.

17. The apparatus of claim 12, further comprising an additional image fixed to an outer surface of said first film.

18. The apparatus of claim 17, wherein said additional image is formed of a food-grade quality ink.

19. The apparatus of claim 12, wherein said first film is of a food-grade quality.

20. The apparatus of claim 12, wherein said high-quality photographic image and said advertising data are combined in accordance with a digital combination process.

21. The apparatus of claim 12, wherein said advertising data is a company logo.

22. The apparatus of claim 12, wherein said utilitarian tableware substrate is a plate.

23. The apparatus of claim 12, wherein said utilitarian tableware substrate is a clamshell.

24. An apparatus for advertising, comprising:

a high-quality photographic image;

one or more image objects positioned in said high-quality photographic image;

advertising data positioned on said one or more image objects of said high-quality photographic image so that said advertising data appears to be part of said image object; and a utilitarian tableware substrate, said high-quality photographic image and said advertising data being fixed thereto, wherein said high-quality photographic image and said advertising data are printed on said utilitarian tableware substrate, and a film is fixed to said utilitarian tableware substrate over said photographic image and said advertising data.

* * * * *